United States Patent
Crane et al.

(10) Patent No.: US 7,193,826 B2
(45) Date of Patent: Mar. 20, 2007

(54) MOTOR DISCONNECT ARRANGEMENT FOR A VARIABLE SPEED DRIVE

(75) Inventors: Curtis Christian Crane, York, PA (US); Scott Victor Slothower, Dillsburg, PA (US)

(73) Assignee: York International Corporation, York, PA (US)

( * ) Notice: Subject to any disclaimer, the term of this patent is extended or adjusted under 35 U.S.C. 154(b) by 285 days.

(21) Appl. No.: 10/789,327

(22) Filed: Feb. 27, 2004

(65) Prior Publication Data

US 2005/0190511 A1 Sep. 1, 2005

(51) Int. Cl.
*H02H 5/04* (2006.01)
*H02H 7/08* (2006.01)
(52) U.S. Cl. .......................................... 361/23; 361/30
(58) Field of Classification Search .................. 361/23, 361/30
See application file for complete search history.

(56) References Cited

U.S. PATENT DOCUMENTS

| | | | |
|---|---|---|---|
| 2,442,021 A | 4/1948 | Rose | |
| 3,390,320 A | 6/1968 | Kammiller et al. | |
| 3,621,365 A | 11/1971 | Beck et al. | |
| 3,909,687 A | 9/1975 | Abbondanti | |
| 4,150,425 A | 4/1979 | Nagano et al. | |
| 4,151,725 A | 5/1979 | Kountz et al. | |
| 4,152,902 A | 5/1979 | Lush | |
| 4,546,423 A | 10/1985 | Seki | |
| 4,787,211 A | 11/1988 | Shaw | |
| 4,877,388 A | 10/1989 | Inaba et al. | |
| 4,958,118 A | 9/1990 | Pottebaum | |
| 5,010,287 A | 4/1991 | Mukai et al. | |
| 5,235,504 A | 8/1993 | Sood | |
| 5,283,708 A * | 2/1994 | Waltz | 361/93.8 |
| 5,350,992 A | 9/1994 | Colter | |
| 5,446,645 A | 8/1995 | Shirahama et al. | |
| 5,488,279 A | 1/1996 | Kawamoto et al. | |
| 5,492,273 A | 2/1996 | Shah | |
| 5,503,248 A | 4/1996 | Peruggi et al. | |

(Continued)

FOREIGN PATENT DOCUMENTS

DE 1004 7629 4/2002

(Continued)

OTHER PUBLICATIONS

Murphy, J.M.D., "Thyristor Control of A.C. Motors", Principles of Variable-Frequency A.C. Drives, Oct. 10, 1975, pp. 3-4, 111-114, & 120-121, Pergamon Press, New York.

*Primary Examiner*—Stephen W. Jackson
*Assistant Examiner*—Dharti H. Patel
(74) *Attorney, Agent, or Firm*—McNees Wallace & Nurick LLC

(57) ABSTRACT

A motor disconnect arrangement is provided for a variable speed drive having a plurality of inverters electrically connected in parallel to a DC link to power a plurality of motors. The disconnect arrangement includes a contactor or other disconnect device connected in series between each inverter output of the variable speed drive and its corresponding motor. The contactor operates to disconnect, isolate or remove the motor from the variable speed drive in the event of a failure of the motor. By removing a failed motor from the variable speed drive, the other motors connected to the variable speed drive can continue to operate normally.

24 Claims, 3 Drawing Sheets

U.S. PATENT DOCUMENTS

| | | | |
|---|---|---|---|
| 5,509,504 A | 4/1996 | McHugh et al. | |
| 5,528,114 A | 6/1996 | Tokizaki et al. | |
| 5,691,625 A * | 11/1997 | Kumar et al. | 322/20 |
| 5,797,729 A * | 8/1998 | Rafuse et al. | 417/3 |
| 5,845,509 A | 12/1998 | Shaw et al. | |
| 5,894,736 A | 4/1999 | Beaverson et al. | |
| 5,896,021 A | 4/1999 | Kumar | |
| 6,008,616 A | 12/1999 | Nagayama et al. | |
| 6,018,957 A | 2/2000 | Katra et al. | |
| 6,023,137 A * | 2/2000 | Kumar et al. | 318/254 |
| 6,031,738 A | 2/2000 | Lipo et al. | |
| 6,124,697 A | 9/2000 | Wilkerson | |
| 6,185,946 B1 | 2/2001 | Hartman | |
| 6,229,722 B1 | 5/2001 | Ichikawa et al. | |
| 6,252,751 B1 * | 6/2001 | Rozman | 361/23 |
| 6,325,142 B1 | 12/2001 | Bosley et al. | |
| 6,370,888 B1 | 4/2002 | Grabon | |
| 6,408,645 B1 | 6/2002 | Tsuboe et al. | |
| 6,434,960 B1 | 8/2002 | Rousseau | |
| 6,459,596 B1 | 10/2002 | Corzine | |
| 6,459,606 B1 | 10/2002 | Jadric | |
| 6,579,067 B1 | 6/2003 | Holden | |
| 6,804,127 B2 * | 10/2004 | Zhou | 363/37 |
| 2003/0041605 A1 | 3/2003 | Butcher et al. | |
| 2003/0098668 A1 * | 5/2003 | Jadric et al. | 318/801 |

FOREIGN PATENT DOCUMENTS

| | | |
|---|---|---|
| EP | 0 695 024 A2 | 1/1996 |
| EP | 1 022 844 A2 | 7/2000 |
| EP | 1 055 885 A2 | 11/2000 |
| EP | 1271067 A | 1/2003 |
| EP | 1376842 A1 | 1/2004 |
| GB | 1579045 | 11/1980 |
| JP | 60102878 | 6/1985 |
| WO | 95/06973 | 3/1995 |
| WO | WO 97/18420 | 5/1997 |

* cited by examiner

MOTOR DISCONNECT ARRANGEMENT FOR A VARIABLE SPEED DRIVE

BACKGROUND OF THE INVENTION

The present invention relates generally to variable speed drives. More specifically, the present invention relates to an arrangement for disconnecting or removing a failed motor from a variable speed drive that has multiple independent inverter outputs.

Many water chiller or refrigeration applications use multiple refrigeration circuits, i.e., two or more refrigeration circuits, each having one or more compressors dedicated to the refrigeration circuit. One purpose of the multiple or redundant refrigerant circuits and compressors is to provide improved reliability of the overall system by having one or more refrigerant circuits and compressors remain operational to provide a reduced level of cooling capacity in the event that a refrigerant circuit and/or compressor fails and can no longer provide cooling capacity.

The corresponding compressor motor for each compressor of a refrigeration circuit can be connected to the AC power grid at the system location. The connection of each compressor motor to the power grid permits the remaining refrigerant circuits and compressors to remain operational even if one refrigerant circuit and/or compressor has a failure. A drawback to connecting the compressor motors to the power grid is that all of the motors are provided only one input voltage and frequency, and thus, can generate only one output speed.

To operate a motor at more than one output speed, a variable speed drive can be inserted between the system power grid and the motor to provide the motor with power at a variable frequency and variable voltage. In the multiple circuit refrigeration system, variable speed operation of the motors can be obtained by providing a corresponding variable speed drive for each compressor motor or by connecting all of the compressor motors in parallel to the inverter output of a variable speed drive. One drawback of using a variable speed drive for each compressor is that the overall chiller system becomes more expensive because multiple drives with a given cumulative power rating are more expensive than a single drive of the same output power rating. One drawback to connecting the compressor motors in parallel to the single inverter output of the variable speed drive is that a fault or failure of one of the motors may disable the variable speed drive and thus prevent the other motors connected to the variable speed drive from operating the remaining compressors on the chiller system. This disabling of the other motors connected to the variable speed drive defeats the function of the redundant refrigerant circuits because all of the refrigerant circuits are disabled as a result of the disabling of the motors and the variable speed drive.

Therefore, what is needed is a disconnect arrangement that can remove or isolate a failed motor connected to a variable speed drive from the other motors connected to the variable speed drive.

SUMMARY OF THE INVENTION

One embodiment of the present invention is directed to a drive system for a plurality of motors having a variable speed drive and a plurality of connecting mechanisms connected in series with the variable speed drive. The variable speed drive includes a converter stage to convert an AC voltage to a DC voltage, a DC link stage to filter and store energy from the converter stage, and an inverter stage having a plurality of inverters electrically connected in parallel to the DC link stage. The converter stage is configured to be electrically connectable to an AC power source. The DC link stage is electrically connected to the converter stage. Each inverter of the plurality of inverters is configured to convert a DC voltage to an AC voltage to power a corresponding motor of the plurality of motors and operates substantially independently of other inverters of the plurality of inverters. Each connecting mechanism of the plurality of connecting mechanisms is connected in series between an inverter of the plurality of inverters and a corresponding motor of the plurality of motors. Each connecting mechanism is configured to disconnect the inverter from the corresponding motor in response to receiving a control signal.

Another embodiment of the present invention is directed to a chiller system having a plurality of compressors incorporated into at least one refrigerant circuit. Each refrigerant circuit has at least one compressor, a condenser arrangement and an evaporator arrangement connected in a closed refrigerant loop. A corresponding motor drives each compressor of the plurality of compressors. A variable speed drive powers the corresponding motors of the plurality of compressors and includes a converter stage, a DC link stage and an inverter stage. The inverter stage has a plurality of inverters each electrically connected in parallel to the DC link stage and each powering a corresponding motor of a compressor of the plurality of compressors. The chiller system also includes a plurality of contactors. Each contactor of the plurality of contactors is connected in series between an inverter of the plurality of inverters and a corresponding motor of a compressor of the plurality of compressors and is configured to enable or disable a connection between the inverter and the corresponding motor of a compressor of the plurality of compressors in response to receiving a control signal.

Still another embodiment of the present invention is directed to a drive system for a multiple compressor chiller system having a plurality of motors. The drive system including a variable speed drive having a converter stage to convert an AC voltage to a DC voltage, a DC link stage to filter and store energy from the converter stage, and an inverter stage having a plurality of inverters electrically connected in parallel to the DC link stage. The converter stage is configured to be electrically connectable to an AC power source. The DC link stage is electrically connected to the converter stage. Each inverter of the plurality of inverters is configured to convert a DC voltage to an AC voltage to power a corresponding motor of the plurality of motors and operates substantially independently of other inverters of the plurality of inverters. The drive system also includes means for isolating a motor of the plurality motor from other motors of the plurality of motors in response to detecting a fault condition in the motor of the plurality of motors.

One advantage of the present invention is that it can isolate a failed motor connected to a variable speed drive without affecting operation of other motors connected to the variable speed drive.

Another advantage of the present invention is that it can be used to reliably and cost-effectively drive multiple motors at variable speeds.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
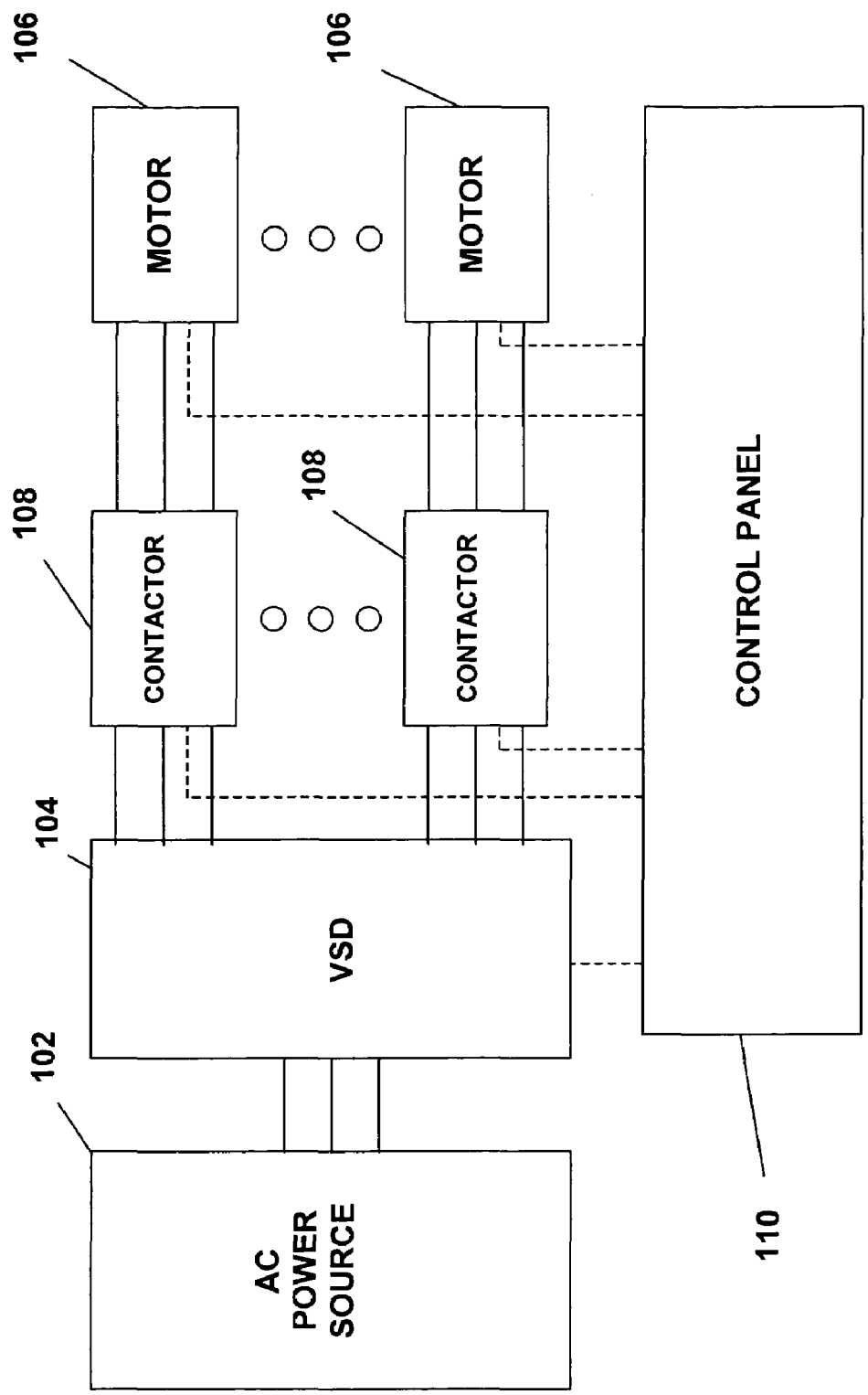
FIG. 1 illustrates a general application of the present invention.

FIG. 1 illustrates generally an application of the present invention. An AC power source 102 supplies a variable speed drive (VSD) 104, which powers a plurality of motors 106. In addition, a plurality of contactors 108 or other connect/disconnect means or devices are connected in series between the VSD 104 and the plurality of motors 106. The motors 106 are preferably used to drive corresponding compressors of a refrigeration or chiller system (see FIG. 3).

The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V at a line frequency of 50 Hz or 60 Hz to the VSD 104, depending on the corresponding AC power grid.

The VSD 104 receives AC power having a particular fixed line voltage and fixed line frequency from the AC power source 102 and provides AC power to each of the motors 106 at desired voltages and desired frequencies, both of which can be varied to satisfy particular requirements. Preferably, the VSD 104 can provide AC power to each of the motors 106 that may have higher voltages and frequencies and lower voltages and frequencies than the rated voltage and frequency of each motor 106. In another embodiment, the VSD 104 may again provide higher and lower frequencies but only the same or lower voltages than the rated voltage and frequency of each motor 106.

A contactor 108 is connected in series between each output of the VSD 104 and its corresponding motor 106 to disconnect, isolate or remove that motor 106 from the VSD 104 in the event of a failure of the motor 106. By removing a failed motor 106 from the VSD 104, the other motors 106 connected to the VSD 104 can continue to operate normally. A microprocessor, controller or control panel 110 is used to control the contactors 108 by sending signals (or not sending signals) to the contactors 108 that energize and de-energize the contactors 108 in response to particular system and motor 106 conditions as detected or sensed by sensors, detectors, probes or other similar devices. The contactors 108 can have normally open contacts that are closed (energized) by the control panel 110 during operation of the motors 106. If the control panel 110 detects a fault, short, ground or other anomalous condition in a motor 106 (or possibly the corresponding motor load), the control panel 110 can open (de-energize) the contacts in the contactor 108 in order to disconnect or isolate the failed motor 106 from the other motors 106 connected to the VSD 104. The contactor 108 can have any suitable arrangement of contacts or other connection devices or mechanisms so long as the contactor 108 can operate to disconnect or isolate a faulted motor 106 from the VSD 104. In another embodiment of the present invention, the contacts in contactor 108 are normally closed contacts that can be opened (energized) by the control panel 110 in response to the detection of a fault in the motor 106. By disconnecting or isolating a damaged or failed motor 106 from the VSD 104, in particular the DC bus of the DC link of the VSD 104 (see FIG. 2), the VSD 104 does not fail and can provide the appropriate power to the remaining motors 106 to permit the remaining motors 106 to operate normally.

In another embodiment of the present invention, the contactors 108 can be controlled by the control panel 110 to enable and disable operation of the motors 106 without the detection of a fault or failure in the motor 106. The enabling and disabling of the motors 106 can be used to control the corresponding motor loads connected to the motors 106, e.g., compressors (see FIG. 3). For example, by disabling a motor 106 by de-energizing a contactor 108, the corresponding motor load of the motor 106 is disabled, which may be desirable depending on the particular application of the motor load. If the motor load is a compressor as discussed above, then the disabling of the motor 106 and compressor can be used to adjust the capacity of the system that incorporates the motor 106 and compressor. Conversely, the enabling of a motor 106 and compressor by energizing contactor 108 can be used to increase the capacity of the corresponding system.

The motors 106 are preferably induction motors that are capable of being operated at variable speeds. The induction motors can have any suitable pole arrangement including two poles, four poles or six poles. However, any suitable motor that can be operated at variable speeds can be used with the present invention.

Figure 2:
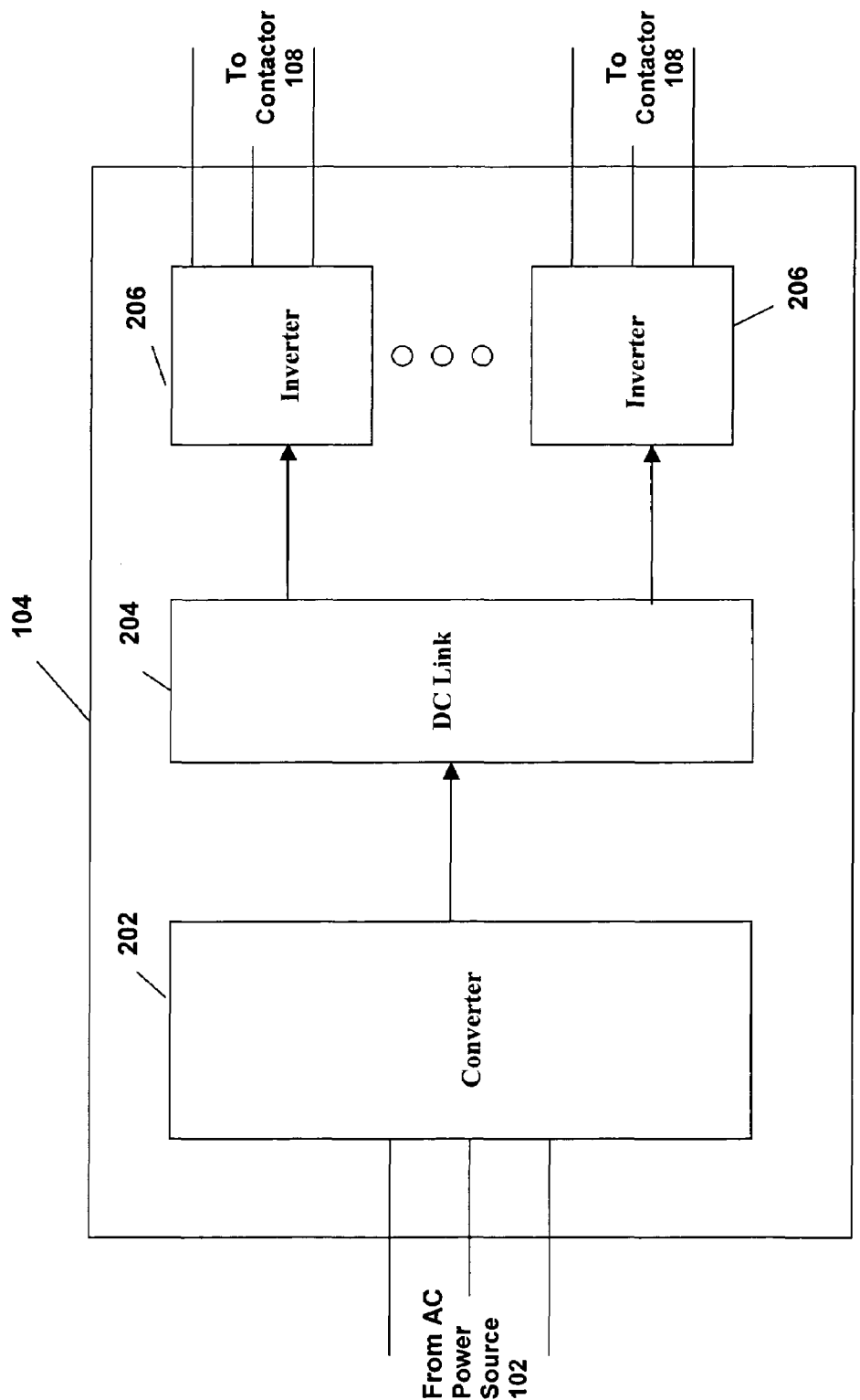
FIG. 2 illustrates schematically a variable speed drive used with the present invention.

FIG. 2 illustrates schematically some of the components in one embodiment of the VSD 104. The VSD 104 can have three stages: a converter or rectifier stage 202, a DC link stage 204 and an output stage having a plurality of inverters 206. The converter 202 converts the fixed line frequency, fixed line voltage AC power from the AC power source 102 into DC power. The converter 202 can be in a rectifier arrangement composed of electronic switches that can only be turned on either by gating, when using silicon controlled rectifiers, or by being forward biased, when using diodes. Alternatively, the converter 202 can be in a converter arrangement composed of electronic switches that can be gated both on and off, to generate a controlled DC voltage and to shape the input current signal to appear sinusoidal, if so desired. The converter arrangement of converter 202 can have several different configurations including a boost conversion configuration (DC voltage varies from a value equal to the square root of two (2) times the RMS AC input voltage to a value greater than the square root of two (2) times the RMS AC input voltage), a buck conversion configuration (DC voltage varies from zero (0) to a value less than the square root of two (2) times the RMS AC input voltage), and a boost/buck configuration (DC voltage varies from zero (0) to a value that can be greater than or less than the square root of two (2) times the RMS AC input voltage). The converter arrangement of converter 202 has an additional level of flexibility over the rectifier arrangement, in that the AC power cannot only be rectified to DC power, but that the DC power level can also be controlled to a specific value. The DC link 204 filters the DC power from the converter 202 and provides energy storage components such as capacitors and/or inductors. Finally, the inverters 206 are connected in parallel on the DC link 204 and each inverter 206 converts the DC power from the DC link 204 into a variable frequency, variable voltage AC power for a corresponding motor 106. The output of each inverter 206 is then connected to a corresponding contactor or connecting mechanism 108 which is connected in series between the inverter 206 and the motor 106.

In a preferred embodiment, the inverters 206 are jointly controlled by a control system such that each inverter 206 provides AC power at the same desired voltage and frequency to corresponding motors based on a common control signal or control instruction provided to the inverters 206. The use of the contactors 108 to enable and disable the motors 106, as discussed above, can be used with the joint control of the inverters 206 to provide a further level of control to the motors 106. In another embodiment, the inverters 206 are individually controlled by a control system to permit each inverter 206 to provide AC power at different desired voltages and frequencies to corresponding motors 106 based on separate control signals or control instructions provided to each inverter 206. This capability permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by the control panel 110 or other suitable control device.

For each motor 106 to be powered by the VSD 104, there is a corresponding inverter 206 in the output stage of the VSD 104 and contactor 108 connected between the motor 106 and the inverter 206. The number of motors 106 that can be powered by the VSD 104 is dependent upon the number of inverters 206 that are incorporated into the VSD 104. In a preferred embodiment, there can be either 2 or 3 inverters 206 incorporated in the VSD 104 that are connected in parallel to the DC link 204 and used for powering a corresponding motor 106. While it is preferred for the VSD 104 to have between 2 and 3 inverters 206, it is to be understood that more than 3 inverters 206 can be used so long as the DC link 204 can provide and maintain the appropriate DC voltage to each of the inverters 206.

In one embodiment of the present invention, the converter 202 can utilize diodes or silicon controlled rectifiers (SCRs) as the power switching mechanisms. The diodes and SCRs can provide the converter 202 with a large current surge capability and a low failure rate. In another embodiment, the converter 202 can utilize a diode or thyristor rectifier coupled to a boost DC/DC converter or a pulse width modulated boost rectifier to provide a boosted DC voltage to the DC link 204 in order to obtain an output voltage from the VSD 104 greater than the input voltage of the VSD 104. The DC link 204 can be composed of capacitors and inductors, which are passive devices that exhibit high reliability rates and very low failure rates. The inverters 206 are power modules that can include power transistors or integrated bipolar power transistor (IGBT) power switches with diodes connected in parallel. Furthermore, it is to be understood that the VSD 104 can incorporate different components from those discussed above and shown in FIG. 2 so long as the inverters 206 of the VSD 104 can provide the motors 106 with appropriate output voltages and frequencies.

The VSD 104 can prevent large inrush currents from reaching the motors 106 during the startup of the motors 106. In addition, the inverters 206 of the VSD 104 can provide the AC power source 102 with power having about a unity power factor. Finally, the ability of the VSD 104 to adjust both the input voltage and input frequency received by the motor 106 permits a system equipped with VSD 104 to be operated on a variety of foreign and domestic power grids without having to alter the motors 106 for different power sources.

Figure 3:
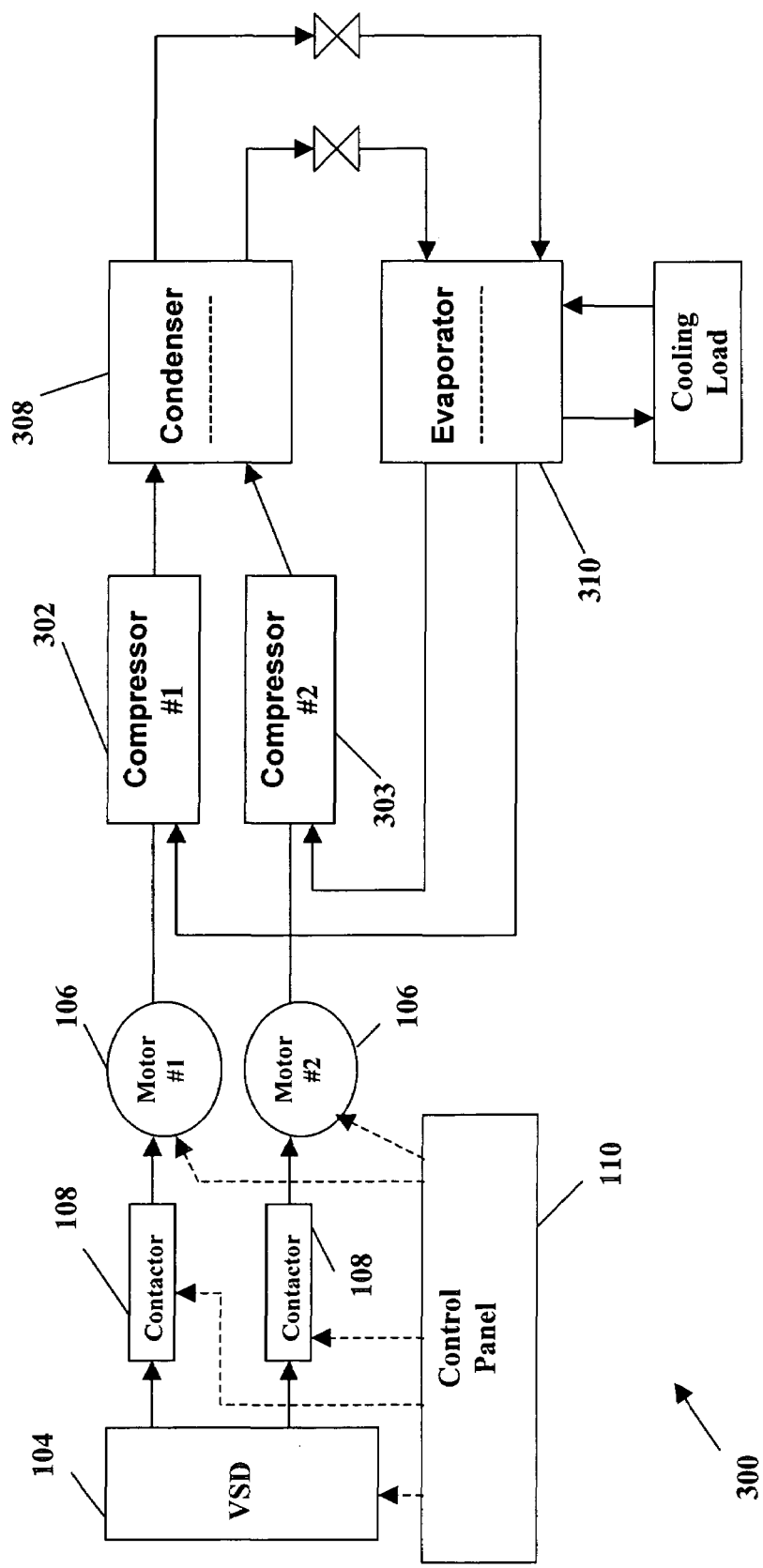
FIG. 3 illustrates an embodiment of the present invention used in a refrigeration or chiller system.

FIG. 3 illustrates generally one embodiment of the present invention incorporated in a refrigeration system. As shown in FIG. 3, the HVAC, refrigeration or liquid chiller system 300 has two compressors incorporated in corresponding refrigerant circuits, but it is to be understood that the system 300 can have one refrigerant circuit or more than two refrigerant circuits for providing the desired system load and more than a single compressor for a corresponding refrigerant circuit. The system 300 includes a first compressor 302, a second compressor 303, a condenser arrangement 308, expansion devices, a water chiller or evaporator arrangement 310 and a control panel 110. The control panel 110 can include an analog to digital (A/D) converter, a microprocessor, a non-volatile memory, and an interface board to control operation of the refrigeration system 300. The control panel 110 can also be used to control the operation of the VSD 104, the motors 106, the contactors 108 and the compressors 302 and 303. A conventional HVAC, refrigeration or liquid chiller system 300 includes many other features that are not shown in FIG. 3. These features have been purposely omitted to simplify the drawing for ease of illustration.

The compressors 302 and 303 compress a refrigerant vapor and deliver it to the condenser 308. The compressors 302 and 303 are preferably connected in separate refrigeration circuits, i.e., the refrigerant output by the compressors 302 and 303 are not mixed and travel in separate circuits through the system 300 before reentering the compressors 302 and 303 to begin another cycle. The separate refrigeration circuits preferably use a single condenser housing 308 and a single evaporator housing 310 for the corresponding heat exchanges. The condenser housing 308 and evaporator housing 310 maintain the separate refrigerant circuits either through a partition or other dividing means within the corresponding housing or with separate coil arrangements. In another embodiment of the present invention, the refrigerant output by the compressors 302 and 303 can be combined into a single refrigerant circuit to travel through the system 300 before being separated to reenter the compressors 302 and 303.

The compressors 302 and 303 are preferably screw compressors or centrifugal compressors, however the compressors can be any suitable type of compressor including reciprocating compressors, scroll compressors, rotary compressors or other type of compressor. The output capacity of the compressors 302 and 303 can be based on the operating speed of the compressors 302 and 303, which operating speed is dependent on the output speed of the motors 106 driven by the inverters 206 of the VSD 104. The refrigerant vapor delivered to the condenser 308 enters into a heat exchange relationship with a fluid, e.g., air or water, and undergoes a phase change to a refrigerant liquid as a result of the heat exchange relationship with the fluid. The condensed liquid refrigerant from condenser 308 flows through corresponding expansion devices to an evaporator 310.

The evaporator 310 can include connections for a supply line and a return line of a cooling load. A secondary liquid, which is preferably water, but can be any other suitable secondary liquid, e.g., ethylene, calcium chloride brine or sodium chloride brine, travels into the evaporator 310 via a return line and exits the evaporator 310 via a supply line. The liquid refrigerant in the evaporator 310 enters into a heat exchange relationship with the secondary liquid to chill the temperature of the secondary liquid. The refrigerant liquid in the evaporator 310 undergoes a phase change to a refrigerant vapor as a result of the heat exchange relationship with the secondary liquid. The vapor refrigerant in the evaporator 310 then returns to the compressors 302 and 303 to complete the cycle. It is to be understood that any suitable configuration of condenser 308 and evaporator 310 can be used in the system 300, provided that the appropriate phase change of the refrigerant in the condenser 304 and evaporator 306 is obtained.

Preferably, the control panel, microprocessor or controller 110, in addition to controlling the contactors 108, can provide control signals to the VSD 104 to control the operation of the VSD 104, and particularly the operation of inverters 206, (and possibly motors 106) to provide the optimal operational setting for the VSD 104 and motors 106 depending on the particular sensor readings received by the control panel 110. For example, in the refrigeration system 300 of FIG. 3, the control panel 110 can adjust the output voltage and frequency from the inverters 206 to correspond to changing conditions in the refrigeration system 300, i.e., the control panel 110 can increase or decrease the output voltage and frequency of the inverters 206 of the VSD 104 in response to increasing or decreasing load conditions on the compressors 302 and 303 in order to obtain a desired operating speed of the motors 106 and a desired capacity of the compressors 302 and 303.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive system for a plurality of motors comprising:
a variable speed drive, the variable speed drive comprising:
a converter stage to convert an input AC voltage to a DC voltage, the converter stage being configured to be electrically connectable to an AC power source;
a DC link stage to filter and store energy from the converter stage, the DC link stage being electrically connected to the converter stage;
an inverter stage comprising a plurality of inverters electrically connected in parallel to the DC link stage, each inverter of the plurality of inverters being configured to convert a DC voltage to an output AC voltage to power a corresponding motor of a plurality of motors, and each inverter of the plurality of inverters being configured to operate substantially independently of other inverters of the plurality of inverters; and
wherein the converter stage is configured to provide a boosted DC voltage to the DC link stage and each inverter of the plurality of inverters is configured to provide an output AC voltage greater than the input AC voltage; and
a plurality of connecting mechanisms, each connecting mechanism of the plurality of connecting mechanisms being connected in series between an inverter of the plurality of inverters and a corresponding motor of the plurality of motors, and wherein each connecting mechanism being configured to disconnect an inverter from a corresponding motor in response to receiving a control signal.

2. The drive system of claim 1 further comprising a control panel to generate the control signal for a connecting mechanism.

3. The drive system of claim 2 wherein the control panel comprises:
means for detecting a fault condition in a motor of the plurality of motors; and
means for generating the control signal for the corresponding connecting mechanism connected to the motor with the detected fault condition in response to the detection of the fault condition in the motor.

4. The drive system of claim 2 wherein the control panel comprises means for generating the control signal in response to a control instruction from a control system controlling a corresponding motor load connected to a motor of the plurality of motors.

5. The drive system of claim 1 wherein the plurality of connecting mechanisms comprises a plurality of contactors.

6. The drive system of claim 5 wherein the plurality of contactors each comprise at least one normally open contact and the control signal de-energizes the at least one normally open contact of a contactor to disconnect an inverter from a corresponding motor.

7. The drive system of claim 5 wherein the plurality of contactors each comprise at least one normally closed contact and the control signal energizes the at least one normally closed contact of a contactor to disconnect an inverter from a corresponding motor.

8. A chiller system comprising:
a plurality of compressors, each compressor of the plurality of compressors being driven by a corresponding motor, the plurality of compressors being incorporated into at least one refrigerant circuit, each refrigerant circuit comprising at least one compressor of the plurality of compressors, a condenser arrangement and an evaporator arrangement connected in a closed refrigerant loop;
a variable speed drive to power the corresponding motors of the plurality of compressors, the variable speed drive being configured to provide an output voltage greater than the input voltage to the variable speed drive, the variable speed drive comprising a converter stage, a DC link stage and an inverter stage, the inverter stage having a plurality of inverters each electrically connected in parallel to the DC link stage and each powering a corresponding motor of a compressor of the plurality of compressors;
a plurality of contactors, each contactor of the plurality of contactors being connected in series between an inverter of the plurality of inverters and a corresponding motor of a compressor of the plurality of compressors, and wherein each contactor being configured to enable or disable a connection between the inverter and the corresponding motor of a compressor of the plurality of compressors in response to receiving a control signal.

9. The chiller system of claim 8 further comprising a control panel to generate a control signal for each contactor of the plurality of contactors.

10. The chiller system of claim 9 wherein the control panel comprises:

means for detecting a fault condition in a corresponding motor of a compressor of the plurality of compressors; and means for generating a control signal for a corresponding contactor connected to the corresponding motor with the detected fault condition to disable the connection between the inverter and the corresponding motor with the detected fault condition.

11. The chiller system of claim 9 wherein the control panel comprises:

means for detecting a fault condition in a corresponding compressor of the plurality of compressors; and means for generating a control signal for a corresponding contactor connected to a corresponding motor of the compressor of the plurality of compressors with the detected fault condition to disable the connection between the inverter and the corresponding motor of the compressor of the plurality of compressors with the detected fault condition.

12. The chiller system of claim 9 wherein the control panel comprises means for generating a control signal for a corresponding contactor connected to a corresponding motor of a compressor of the plurality of compressors to enable the connection between the inverter and the corresponding motor of a compressor of the plurality of compressors.

13. The chiller system of claim 8 wherein the plurality of contactors comprise a plurality of normally open contacts.

14. The chiller system of claim 13 wherein the control signal de-energizes the normally open contacts to disable the connection between an inverter and a corresponding motor of a compressor of the plurality of compressors.

15. The chiller system of claim 13 wherein the control signal energizes the normally open contacts to enable the connection between an inverter and a corresponding motor of a compressor of the plurality of compressors.

16. The chiller system of claim 8 wherein the plurality of contactors comprise a plurality of normally closed contacts.

17. The chiller system of claim 16 wherein the control signal energizes the normally closed contacts to disable the connection between an inverter and a corresponding motor of a compressor of the plurality of compressors.

18. The chiller system of claim 16 wherein the control signal de-energizes the normally closed contacts to enable the connection between an inverter and a corresponding motor of a compressor of the plurality of compressors.

19. A drive system for a multiple compressor chiller system having a plurality of motors, the drive system comprising:

a variable speed drive, the variable speed drive comprising:

a converter stage to convert an input AC voltage to a DC voltage, the converter stage being configured to be electrically connectable to an AC power source;

a DC link stage to filter and store energy from the converter stage, the DC link stage being electrically connected to the converter stage;

an inverter stage comprising a plurality of inverters electrically connected in parallel to the DC link stage, each inverter of the plurality of inverters being configured to convert a DC voltage to an output AC voltage to power a corresponding motor of a plurality of motors, and each inverter of the plurality of inverters being configured to operate substantially independently of other inverters of the plurality of inverters; and wherein the converter stage is configured to provide a boosted DC voltage to the DC link stage and each inverter of the plurality of inverters is configured to provide an output AC voltage greater than the input AC voltage;and means for isolating a motor of the plurality of motors from other motors of the plurality of motors in response to detecting a fault condition in the motor of the plurality of motors.

20. The drive system of claim 19 wherein the means for isolating a motor comprises a plurality of contactors, each contactor of the plurality of contactors being connected in series between an inverter of the plurality of inverters and a corresponding motor of the plurality of motors, and wherein each contactor being configured to disconnect an inverter from a corresponding motor of the plurality of motors with a detected fault condition.

21. The drive system of claim 20 wherein the plurality of contactors comprise a plurality of normally open contacts.

22. The chiller system of claim 21 wherein the normally open contacts are de-energized to disconnect an inverter from a corresponding motor with a detected fault condition.

23. The chiller system of claim 20 wherein the plurality of contactors comprise a plurality of normally closed contacts.

24. The chiller system of claim 23 wherein the normally closed contacts are energized to disconnect an inverter from a corresponding motor of the plurality of motors with a detected fault condition.

* * * * *

UNITED STATES PATENT AND TRADEMARK OFFICE
CERTIFICATE OF CORRECTION

| | | |
|---|---|---|
| PATENT NO. | : 7,193,826 B2 | Page 1 of 1 |
| APPLICATION NO. | : 10/789327 | |
| DATED | : March 20, 2007 | |
| INVENTOR(S) | : Crane et al. | |

It is certified that error appears in the above-identified patent and that said Letters Patent is hereby corrected as shown below:

Col. 10, Line 41, "motor with" should read --motor of the plurality of motors with--

Signed and Sealed this

Twenty-eighth Day of September, 2010

David J. Kappos
*Director of the United States Patent and Trademark Office*